US007238109B2

(12) United States Patent
McGahn et al.

(10) Patent No.: US 7,238,109 B2
(45) Date of Patent: *Jul. 3, 2007

(54) GAMING DEVICE HAVING AN UNVEILING AWARD MECHANICAL SECONDARY DISPLAY

(75) Inventors: Steven P. McGahn, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/629,416

(22) Filed: Jul. 29, 2003

(65) Prior Publication Data

US 2004/0023710 A1 Feb. 5, 2004

Related U.S. Application Data

(63) Continuation of application No. 10/165,132, filed on Jun. 6, 2002, now Pat. No. 6,659,864, which is a continuation of application No. 09/689,510, filed on Oct. 12, 2000, now abandoned.

(51) Int. Cl.
*G06F 17/00* (2006.01)
*G06F 19/00* (2006.01)

(52) U.S. Cl. ............................ 463/16; 463/17; 463/18; 463/19; 463/20; 273/138.1; 273/139; 273/142 B

(58) Field of Classification Search ............ 463/16–20, 463/25, 30, 31, 46, 9–13, 47, 40–42; 273/138.1, 273/138.2, 139, 143 R, 269, 271, 273, 142 B; 283/903

See application file for complete search history.

(56) References Cited

U.S. PATENT DOCUMENTS 1,978,395 A 10/1934 Groetchen
2,012,502 A 8/1935 Fey
2,969,610 A 1/1961 Weiner
3,420,525 A 1/1969 Waders
3,642,287 A 2/1972 Lally et al.

(Continued)

FOREIGN PATENT DOCUMENTS

DE 3811301 A1 * 10/1989

(Continued)

OTHER PUBLICATIONS

Top Dollar Article written by IGT, published in 1998.

(Continued)

*Primary Examiner*—Robert E. Pezzuto
*Assistant Examiner*—Milap Shah
(74) *Attorney, Agent, or Firm*—Bell, Boyd & Lloyd LLP

(57) ABSTRACT

A gaming device, which awards an initial award to a player, discloses to a player that a higher valued enticement award is available and selectable, and enables the player to selectively swap the initial award for an opportunity to select the enticement award. The game preferably discloses the value of the initial award and the enticement award. The game masks the enticement award in a pattern along with one or more masked consolation awards, the consolation awards having values less than the value of the initial award. The game reveals the awards using a secondary display having mechanical doors that open and close.

73 Claims, 10 Drawing Sheets

U.S. PATENT DOCUMENTS

| | | | | |
|---|---|---|---|---|
| 3,735,987 | A | | 5/1973 | Ohki |
| 4,326,351 | A | | 4/1982 | Heywood et al. |
| 4,660,833 | A | | 4/1987 | Dickinson et al. |
| 4,695,053 | A | | 9/1987 | Vazquez, Jr. et al. |
| 5,152,529 | A | | 10/1992 | Okada |
| 5,342,047 | A | | 8/1994 | Heidel et al. |
| 5,364,100 | A | | 11/1994 | Ludlow et al. |
| 5,449,173 | A | | 9/1995 | Thomas et al. |
| 5,655,961 | A | | 8/1997 | Acres et al. |
| 5,741,183 | A | | 4/1998 | Acres et al. |
| 5,788,230 | A | * | 8/1998 | Krise et al. ............. 273/121 B |
| 5,788,573 | A | | 8/1998 | Baerlocher et al. |
| 5,823,874 | A | | 10/1998 | Adams |
| 5,826,459 | A | | 10/1998 | Kataoka et al. |
| D400,597 | S | | 11/1998 | Hedrick et al. |
| 5,833,536 | A | | 11/1998 | Davids et al. |
| 5,836,817 | A | | 11/1998 | Acres et al. |
| D403,363 | S | | 12/1998 | McGahn et al. |
| 5,848,932 | A | | 12/1998 | Adams |
| D404,436 | S | | 1/1999 | McGahn et al. |
| 5,876,284 | A | | 3/1999 | Acres |
| 5,882,261 | A | | 3/1999 | Adams |
| 5,890,962 | A | | 4/1999 | Takemoto |
| 5,911,418 | A | | 6/1999 | Adams |
| 5,951,397 | A | | 9/1999 | Dickinson |
| 5,997,400 | A | | 12/1999 | Seelig et al. |
| 5,997,401 | A | | 12/1999 | Crawford |
| 6,004,207 | A | | 12/1999 | Wilson, Jr. et al. |
| 6,015,346 | A | | 1/2000 | Bennett |
| 6,033,307 | A | | 3/2000 | Vancura |
| 6,056,642 | A | | 5/2000 | Bennett |
| 6,059,289 | A | | 5/2000 | Vancura |
| 6,059,658 | A | | 5/2000 | Mangano et al. |
| 6,086,066 | A | | 7/2000 | Takeuchi et al. |
| 6,089,976 | A | | 7/2000 | Schneider et al. |
| 6,089,978 | A | | 7/2000 | Adams |
| 6,105,962 | A | | 8/2000 | Malavazos et al. |
| 6,113,098 | A | | 9/2000 | Adams |
| 6,117,009 | A | | 9/2000 | Yoseloff |
| 6,126,542 | A | | 10/2000 | Fier |
| 6,135,884 | A | | 10/2000 | Hedrick et al. |
| 6,142,873 | A | | 11/2000 | Weiss et al. |
| 6,142,874 | A | | 11/2000 | Kodachi |
| 6,159,095 | A | | 12/2000 | Frohm et al. |
| 6,159,097 | A | | 12/2000 | Gura |
| 6,159,098 | A | | 12/2000 | Slomiany et al. |
| 6,162,122 | A | | 12/2000 | Acres et al. |
| 6,173,955 | B1 | | 1/2001 | Perrie et al. |
| 6,174,235 | B1 | | 1/2001 | Walker et al. |
| 6,179,711 | B1 | | 1/2001 | Yoseloff |
| 6,210,279 | B1 | | 4/2001 | Dickinson |
| 6,231,442 | B1 | | 5/2001 | Mayeroff |
| 6,244,958 | B1 | | 6/2001 | Acres |
| 6,254,481 | B1 | | 7/2001 | Jaffe |
| 6,254,483 | B1 | | 7/2001 | Acres |
| 6,257,981 | B1 | | 7/2001 | Acres et al. |
| 6,261,177 | B1 | | 7/2001 | Bennett |
| 6,270,411 | B1 | | 8/2001 | Gura et al. |
| 6,302,790 | B1 | | 10/2001 | Brossard |
| 6,309,299 | B1 | | 10/2001 | Weiss |
| 6,312,333 | B1 | | 11/2001 | Acres |
| 6,312,334 | B1 | | 11/2001 | Yoseloff |
| 6,319,125 | B1 | | 11/2001 | Acres |
| 6,371,852 | B1 | | 4/2002 | Acres |
| 6,375,570 | B1 | | 4/2002 | Poole |
| RE37,885 | E | | 10/2002 | Acres |
| 6,565,436 | B1 | | 5/2003 | Baerlocher |
| 6,609,969 | B1 | | 8/2003 | Luciano et al. |
| 6,659,864 | B2 | * | 12/2003 | McGahn et al. .............. 463/16 |
| RE38,812 | E | | 10/2005 | Acres et al. |
| 7,131,908 | B2 | | 11/2006 | Baerlocher |

FOREIGN PATENT DOCUMENTS

| | | | | |
|---|---|---|---|---|
| EP | 0874337 | A1 | | 10/1998 |
| EP | 0945837 | A2 | | 9/1999 |
| EP | 0984408 | A2 | | 3/2000 |
| EP | 0984409 | A2 | | 3/2000 |
| GB | 1 262 134 | | | 2/1972 |
| GB | 1 464 896 | | | 2/1977 |
| GB | 2144644 | A | | 3/1985 |
| GB | 2 287 567 | | | 9/1995 |
| GB | 2 383 668 | | | 7/2003 |
| JP | 08-173591 | | * | 9/1996 |
| WO | WO 9732285 | | | 9/1997 |
| WO | WO 00/12186 | | | 3/2000 |
| WO | WO 0032286 | | | 6/2000 |

OTHER PUBLICATIONS

Jackpot Party Brochure and Articles written by WMS Gaming, Inc published in 1998.

Addams Family Brochure and Articles written by IGT, Strictly Slots, published in 2000.

Wheel of Fortune Article written by IGT, published in 1999.

Sphinx Article written by Atronic Casino Technology, Ltd., published in 1997.

Caribbean Gold II written by Aristocrat Incorporated, published in 1998.

South Park—Dodgeball Brochure written by IGT, published in 2000.

Take Your Pick Brochure and Article written by IGT/Anchor Games, Strictly Slots, published in 1999.

Cash Box Brochure and Articles written by Anchor Games, Strictly Slots, published in 2000.

The Official Let's Make a Deal Website written by Bally Gaming System Website, printed on Mar. 16, 2001.

Description of Let's Make a Deal Television Show written by letsmakeadeal.com (2 pages), printed on Mar. 16, 2001.

Let's Make a Deal written by geocities.com (2 pages), printed on Mar. 16, 2001.

Let's Make a Deal written by geocities.com (10 pages), printed on Mar. 21, 2001.

Let's Make a Deal written by fortunecity.com (4 pages), printed on Mar. 21, 2001.

The Deals of Let's Make a Deal written by fortunecity.com (2 pages), printed Mar. 16, 2001.

Let's Make a Deal written by Illinoislottery.com (1 pages), printed on Mar. 21, 2001.

Let's Make a Deal Game Brochure written by Bally Gaming Systems, published in 1999.

Description of Expanding Symbol, published by IGT.

Example Lottery Scratch Card Games, published by Illinois Lottery.

Fey, Slot Machines, A Pictorial History of the First 100 Years, Liberty Belle Books, 1983, pp. 79, 150, 171, 231.

* cited by examiner

FIG.10

| | 70 | 72 | 74 | 76 |
|---|---|---|---|---|
| 68 | PLAYER'S SELECTIONS | GAME FIRST REVEALS | GAME SECONDLY REVEALS | GAME FINALLY REVEALS |
| 78 | INITIAL AWARD | RANDOM EXCEPT FOR HIGH | RANDOM EXCEPT FOR HIGH | HIGH VALUE AWARD |
| 80 | LOW VALUED AWARD | AN INTERMEDIATE AWARD | PLAYER'S SELECTIONS | HIGH VALUE AWARD |
| 82 | AN INTERMEDIATE AWARD | LOW VALUED AWARD | PLAYER'S SELECTIONS | HIGH VALUE AWARD |
| 84 | HIGH VALUED AWARD | RANDOM EXCEPT FOR HIGH | RANDOM EXCEPT FOR HIGH | PLAYER'S SELECTIONS |

FIG.11

| | 88 | 90 | 92 | 96 | 98 | 100 |
|---|---|---|---|---|---|---|
| 86 | PLAYER'S SELECTIONS | GAME FIRST REVEALS | GAME SECONDLY REVEALS | GAME THIRDLY REVEALS | GAME FOURTHLY REVEALS | GAME FIFTHLY REVEALS |
| 102 | INITIAL AWARD | RANDOM LOW OR INTERMEDIATE | RANDOM LOW OR INTERMEDIATE | RANDOM LOW OR INTERMEDIATE | RANDOM HIGH VALUE | RANDOM HIGH VALUE |
| 104 | LOW VALUE AWARD | RANDOM INTERMEDIATE | RANDOM INTERMEDIATE | RANDOM HIGH VALUE | PLAYER'S SELECTIONS | RANDOM HIGH VALUE |
| 106 | INTERMEDIATE AWARDS | RANDOM NON PLAYER INTERMEDIATE OR LOW VALUE AWARD | RANDOM NON PLAYER INTERMEDIATE OR LOW VALUE AWARD | RANDOM HIGH VALUE | PLAYER'S SELECTIONS | RANDOM HIGH VALUE |
| 108 | HIGH VALUE AWARDS | RANDOM LOW OR INTERMEDIATE | RANDOM LOW OR INTERMEDIATE | NON PLAYER SELECTION HIGH | RANDOM LOW OR INTERMEDIATE | PLAYER SELECTION HIGH |

GAMING DEVICE HAVING AN UNVEILING AWARD MECHANICAL SECONDARY DISPLAY

PRIORITY CLAIM

This application is a continuation of and claims the benefit of U.S. patent application Ser. No. 10/165,132, filed Jun. 6, 2002 now U.S. Pat. No. 6,659,864, which is a continuation of and claims the benefit of U.S. patent application Ser. No. 09/689,510, filed Oct. 12, 2000 now abandoned.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a secondary display with a mechanical display mechanism which reveals an award to a player in an exciting and entertaining manner.

BACKGROUND OF THE INVENTION

Gaming devices currently exist with bonus rounds in which a player has one or more opportunities to choose masked bonus awards from a pattern or group of masked awards displayed to the player. When the player chooses a masked award from the pattern or group, the game removes the mask and either awards the player with a bonus value or terminates the bonus round with a bonus terminator. The outcome depends upon whether the player selects an award or a terminator.

In the above game, the controller of the gaming device randomly places a predetermined number of masked awards and terminators in the pattern at the beginning of the bonus round and maintains the positioning until the bonus round terminates. When the player selects a masked award, the player receives the value of the award, and the game typically displays a message that the player may continue and enables the player to select another masked award. The player then selects another masked award, and the process continues until the player selects a masked terminator. European Patent Application No. EP 0 945 837 A2 filed on Mar. 18, 1999 and assigned on its face to WMS Gaming, Inc. discloses a bonus scheme of this type.

Gaming machines also currently exist with bonus rounds in which the game selects or determines the player's award. PCT patent application PCT/AU97/00121 entitled, Slot Machine Game with Roaming Wild Card, having a publication date of Sep. 4, 1997, discloses an example. In this invention, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award.

In the first known game, the "go-until" or "do-until" bonus round can end quite quickly if the player selects a terminator early in the bonus round. The player blindly selects masked awards until selecting the bonus terminator, which is immediately displayed. The player knows nothing about the location of any particular award, and there is no logical incentive to select any particular masked award as opposed to any another masked award. Choosing a masked award also poses no risk to a previously accumulated award. That is, there is no incentive to stop selecting. The only logical course is for the player to continue selecting until selecting a terminator. The player's involvement in the bonus round and thus the player's level of enjoyment and excitement from the bonus round is thus limited.

The second known game has even less player interaction. The game completely determines the bonus round award, and the player has no affect on the outcome. The player is a mere observer to the bonus round sequence and participates only by receiving an award. In both games, the player is not prompted to calculate, weigh options, or explore any consequences of any action. To increase player excitement and enjoyment, it is desirable to provide a gaming device, and more specifically a bonus round of a gaming device, which prompts a player to calculate, weigh options and explore the consequences of the player's selection.

In the known "go-until" or "do-until" bonus round, the game reveals all unselected awards and terminators associated with the pattern after the player selects a terminator. No specific reference is made as to how or in which manner the game reveals the unselected awards or terminators. Revealing the masks from selected and unselected awards and other gaming device components is well known in the art. No known game, however, reveals awards or other gaming device components in any particular manner or employs any particular method of deciding which awards to reveal first, second, etc. It should be appreciated, that in a game which prompts a player to calculate, weigh options, and explore the consequences of the player's selection, it is desirable to reveal the consequences of the player's selection in a manner that maximizes player excitement and enjoyment.

SUMMARY OF THE INVENTION

The present invention provides a gaming device, and more particularly a bonus round of a gaming device, having an award generation apparatus and method, whereby the game awards an initial award to a player, discloses to a player that a higher valued enticement award is available and selectable, and enables the player to selectively exchange the initial award for an opportunity to select the enticement award. The game preferably discloses the value of the initial award and the enticement award. The game masks the enticement award in a pattern along with one or more masked consolation awards, the consolation awards having values less than the value of the initial award.

In one embodiment, the gaming device masks the awards utilizing a mechanical display mechanism. The display mechanism masks the award with one or more mechanical doors until the award is provided to the player. The display mechanism opens the door or doors to reveal the masked award to the player in an entertaining and exciting manner.

The present invention provides the player with an option to keep the initial award or exchange the initial award for one of preferably three masked awards: a high value enticement award, an intermediate consolation award and a low value consolation award. The game can then repeat this sequence any number of times. The player selects a selector, associated with the player's choice, i.e., an initial award selector or a selector associated with the desired masked award. The selectors are preferably displayed on a touch screen display device connected to the gaming device. The game thereby enables the player to simply touch the desired masked award.

If the player decides to forgo the initial award and elect to exchange, and selects the low valued award, the game reveals the intermediate award first, the selected low valued award second, and the high valued award third. If the player picks the intermediate award, the game reveals the low valued award first, the selected intermediate award second, and the high valued award third.

If the player picks the high valued or enticement award, the game preferably randomly selects whether to display the low valued or intermediate consolation award first and displays the high valued award third. The game reveals the awards in a predetermined sequence, which attempts to maximize the player's excitement and enjoyment. If the player keeps the initial award, deciding not to exchange, the game can instantly reveal all the masked awards or reveal the masked awards according to the same predetermined sequence disclosed with respect to a player's choice of the enticement award.

It should be appreciated that the game preferably applies two rules in revealing the awards in the manner previously disclosed. First, the game preferably never reveals the player selected award first. The game either reveals a player selected low valued or intermediate award second or reveals a player selected high valued award third. Second, the game preferably always reveals the high valued enticement award third.

The game preferably reveals the awards using the touch screen display device mentioned above. The game can remove a mask to uncover the award hidden beneath. Alternatively, the game can provide a separate display area, which displays the selected or, alternatively, a plurality or all the awards. In one embodiment, the game contemplates providing an electromechanical door and secondary display device, separate from the main display device, which opens up to reveal an award. The door can either be dedicated to a particular selector, or can open up to reveal an entire sequence of awards as described above.

It is therefore an object of the present invention to provide a bonus round of gaming device, wherein the game prompts a player to calculate, weigh options, and explore the consequences of the player's selection.

Another object of the present invention is to provide a gaming device that prompts a player to calculate, weigh options, explore the consequences of the player's selection, and to reveal the consequences of the player's selection in a manner that attempts to maximize player excitement and enjoyment.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 10 is a chart illustrating the reveal sequence of the present invention, wherein the player selects either an initial award, a low valued masked award, an intermediate masked award, or a high valued masked award;

FIG. 11 is a chart illustrating the reveal sequence of the present invention, wherein the player can select from an initial award, a low valued masked award, a plurality of intermediate masked awards, and a plurality of high valued masked awards;

DETAILED DESCRIPTION OF THE INVENTION

Gaming Device and Electronics

Figure 1:
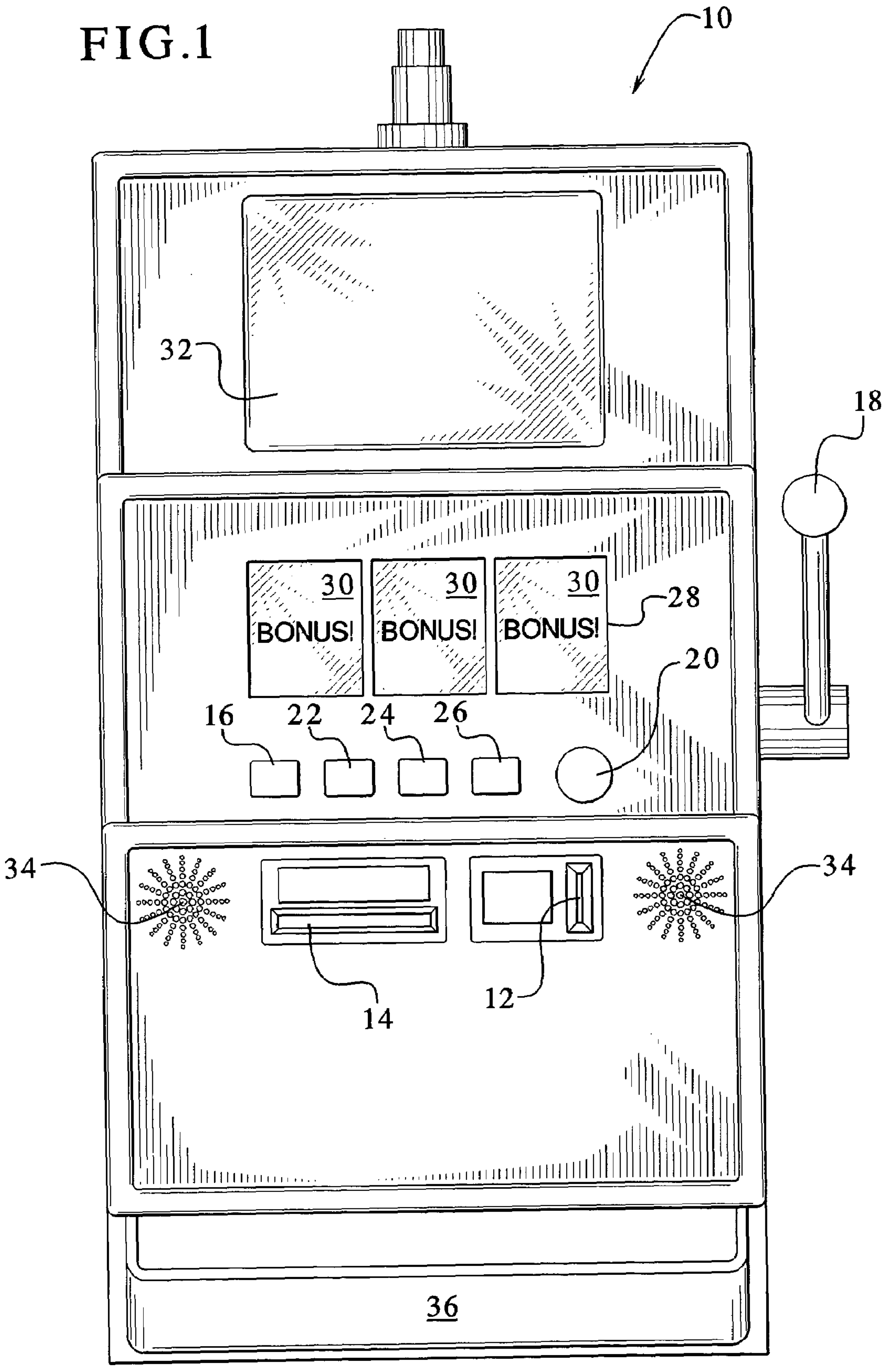
FIG. 1 is a front elevational view of a general embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or in video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. The present invention preferably employs or uses credits, however, the present invention is not limited to the use of credits and contemplates employing other units of value such as money. For purposes of describing and claiming this invention, the term "credit" includes any unit of value such as a gaming device credit or actual money.

After depositing the appropriate amount of money, a player can begin the game by pulling arm 18 or by pushing play button 20. Play button 20 can be any play activator used by the player which starts any game or sequence of events in the gaming device.

Referring to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which contains a plurality of reels 30, preferably three to five reels in mechanical or video form. Each reel 30 displays a plurality of symbols such as bells, hearts, martinis, fruits, cactuses, numbers, cigars, letters, bars or other images, which preferably correspond to a theme associated with the gaming device 10. If the reels 30 are in video form, the gaming device 10 preferably displays the video reels 30 in a display device described below. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards that keep track of the player's credits.

With respect to electronics, the controller of gaming device 10 preferably includes the electronic configuration generally illustrated in FIG. 2, which has: a processor 38; a memory device 40 for storing program code or other data; a display device 32 (i.e., a liquid crystal display) described below; a plurality of speakers 34; and at least one input device as indicated by block 33. The processor 38 is preferably a microprocessor or microcontroller-based platform that is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code, which controls the gaming device 10 so that it plays a particular game in accordance with applicable game rules and paytables.

Figure 2:
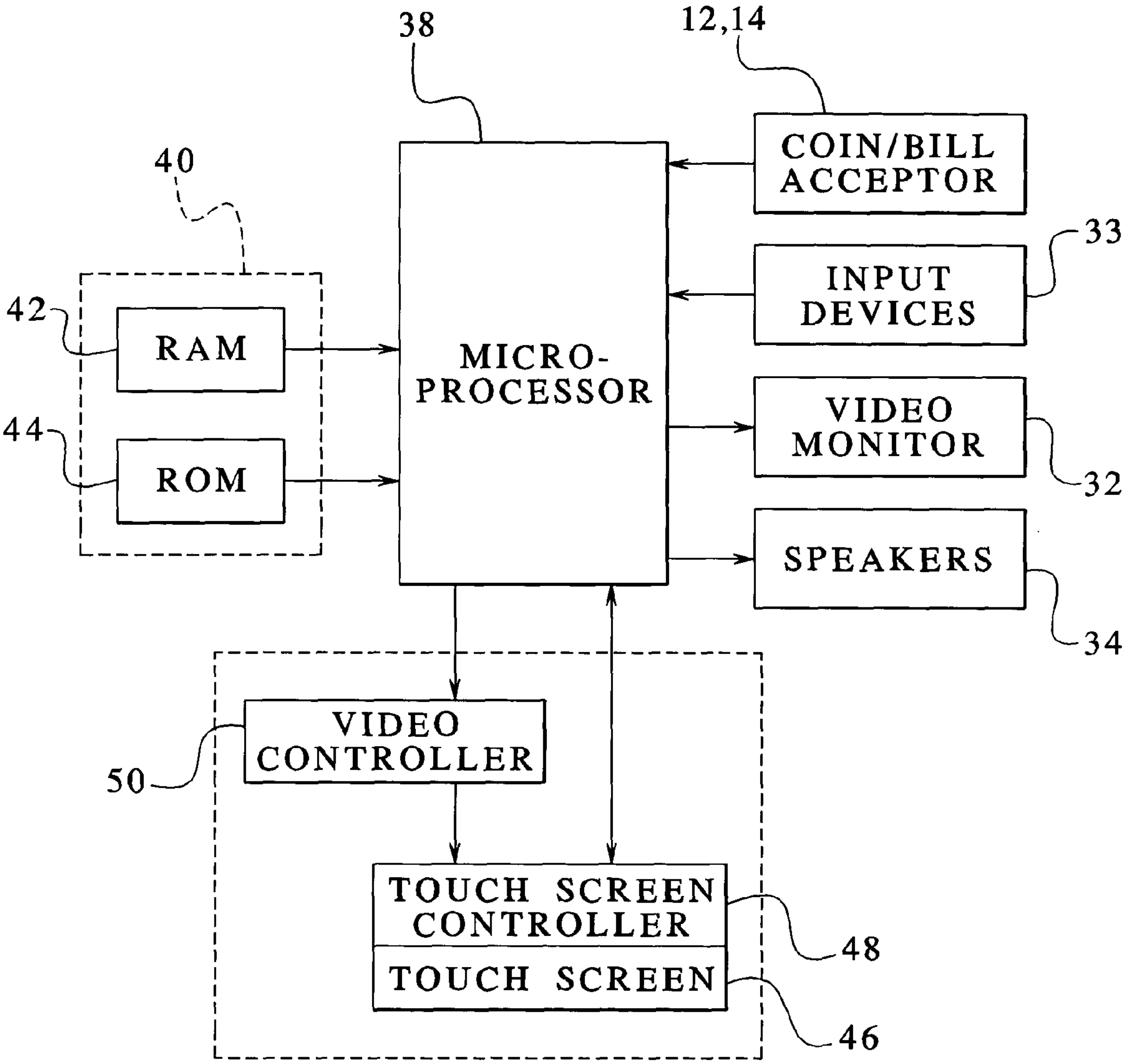
FIG. 2 is a schematic block diagram of the electronic configuration of one embodiment of the gaming device of the present invention.

As illustrated in FIG. 2, the player preferably uses the input devices 33, such as the arm 18, play button 20, the bet one button 24 and the cash out button 26 to input signals into gaming device 10. In certain instances, a touch screen 46 and an associated touch screen controller 48 can be used in conjunction with a display device described in detail below. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus round. This type of gaming device 10 will include a program that will automatically begin a bonus round when the player has achieved a qualifying condition in the game. This qualifying condition can be a particular arrangement of indicia on the display window 28. The gaming device 10 also includes a display device such as a display device 32 shown in FIG. 1 enabling the player to play the bonus round. The display device 32 can be any known video monitor, television screen, dot matrix display, CRT, LED, LCD or electro-luminescent display. The display device 32 can be color or monochrome although, preferably, the display is color. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Award Selection Embodiments

Figure 3:
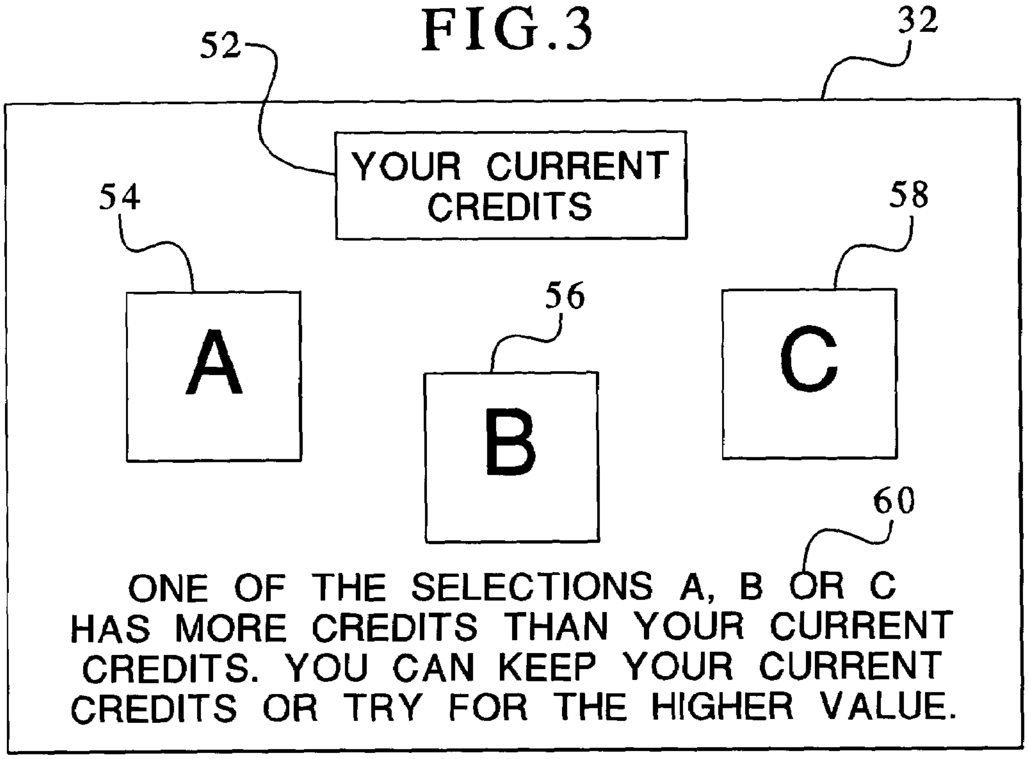
FIG. 3 is a front elevational view of the display device illustrating one embodiment of the present invention, wherein the game discloses that an initial award and an enticement award exist.

Referring now to FIG. 3, an enlarged front elevational view of the display device 32 is shown containing award selection components of the present invention. The display device includes an initial award selector 52 and a plurality of masking award selectors 54, 56 and 58. An initial award is the current award given to the player and is the award generated by the bonus round if the player decides not to exchange for one of the masked awards. The masking award selectors individually mask one or more enticement awards and one or more consolation awards. Enticement awards have values greater than the initial award and consolation awards preferably have values less than the initial award. The consolation awards are preferably greater than zero. In an embodiment where the present invention is a stand alone game rather than a bonus round, however, one or more consolation award can be zero.

As mentioned above, the display device 32 preferably includes a touch screen 46 and an associated touch screen controller 48. Each of the selectors 54, 56 and 58 on display device 32 is thus preferably a player selectable area, which sends a unique input signal to the controller of the present invention. Alternatively, the present invention contemplates providing one or more front panel mountable input devices 33, which are well known in the art, and that enable a player to select one or more selectors from the groups.

The game also preferably includes a visual and/or audio prompt. FIG. 3 illustrates the prompt 60 as a visual message on the display device 32. The prompt 60 is shown as a literal visual message, however, the game could also display a prompt in graphical or tabulated form. It should be appreciated that the game can also provide an audio prompt in place of or in addition to the written prompt 60. The audio prompt is preferably produced shortly after the game displays the bonus round screen of FIG. 3 and can be repeated until the player makes a selection.

A prompt, in general, quickly sets forth the operation of the bonus round, namely, the boundaries of the proposed award exchange. The exchange preferably sets forth the stakes for the player, including some indication of the risk and potential award. As will be illustrated, the present invention contemplates providing more or less risk and award information to the player. The player thereafter makes a selection with this information.

FIG. 3 illustrates an award selection embodiment, wherein the prompt 60 discloses a minimum amount of information necessary to enable the player to play the game. The prompt 60 discloses that one of the selectors 54, 56 or 58 contain more credits than the player's current credits contained in the initial award selector 52. The player does not know the value of the initial award 52 or of any of the masking selectors 54, 56 and 58. Nevertheless, the information does inform the player that there exists at least a one in three chance of increasing the player's award. The prompt discloses no information as to the values of the two remaining of the masking selectors.

In the award selection embodiment of FIG. 3 and in all succeeding selection embodiments, the game can employ more than one initial award selector 52. In this instance, the prompt 60 includes a suitable message, such as, "One of the selections A, B, or C has more credits than either of your current credits. You can select one of your current credits or try for a higher value."

Figure 4:
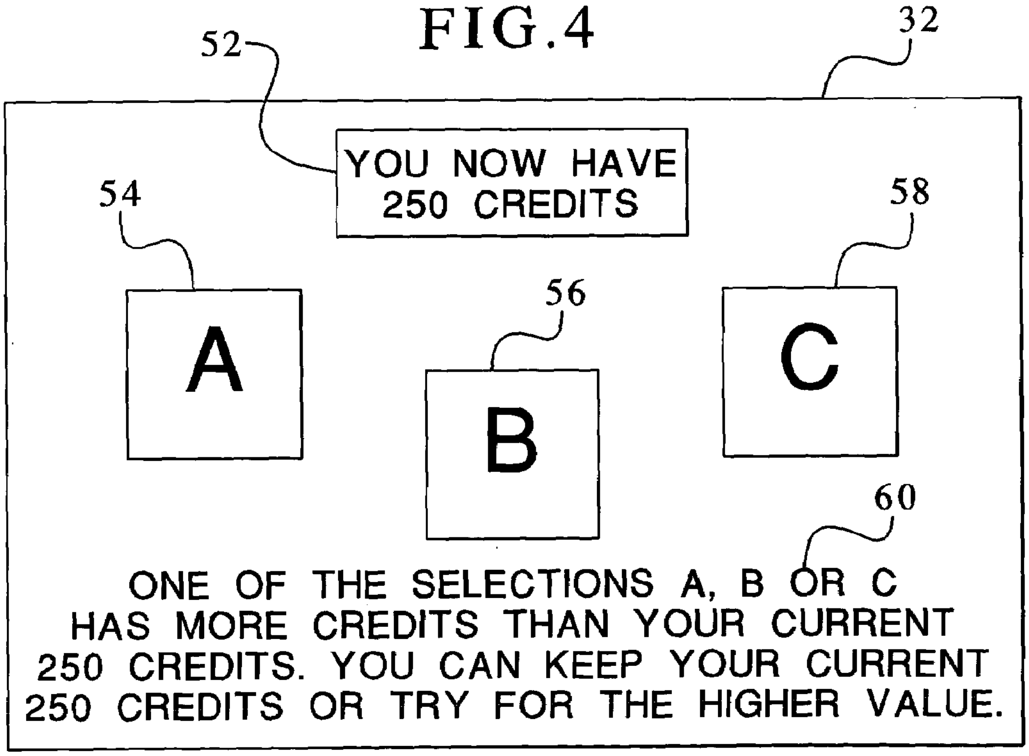
FIG. 4 is a front elevational view of the display device illustrating another embodiment of the present invention, wherein the game discloses the value of the initial award and that an enticement award exists.

Referring now to FIG. 4, another award selection embodiment is illustrated, wherein the game visually discloses more information than in the embodiment of FIG. 3. In this embodiment, the initial award selector 52 and the prompt 60 disclose the value of the initial award, e.g., the phrase, "You now have 250 credits." The game can place the disclosure value anywhere, as long as a player can readily associate the disclosure to the initial award selector 52. The prompt 60 sets forth that one of the masking selectors 54, 56 and 58 contains more credits than the player's 250 current credits. The player has no idea how many more credits are obtainable, nor the relative values of the other two selectors. The player does know the value of the "safe" play, i.e., selecting the initial award selector 52.

In the award selection embodiment of FIG. 4 and in all preceding and succeeding selection embodiments, the game can employ an initial award selector 52 having more than one initial award. For instance if there are two initial awards, the prompt 60 includes a suitable message, such as, "Two of the selections A, B, or C have more combined credits than your current 500 combined credits. You can keep both of your current credits or pick any two of A, B, or C and try for a higher value." Here, selecting the initial award selector 52 selects both initial awards.

Figure 5:
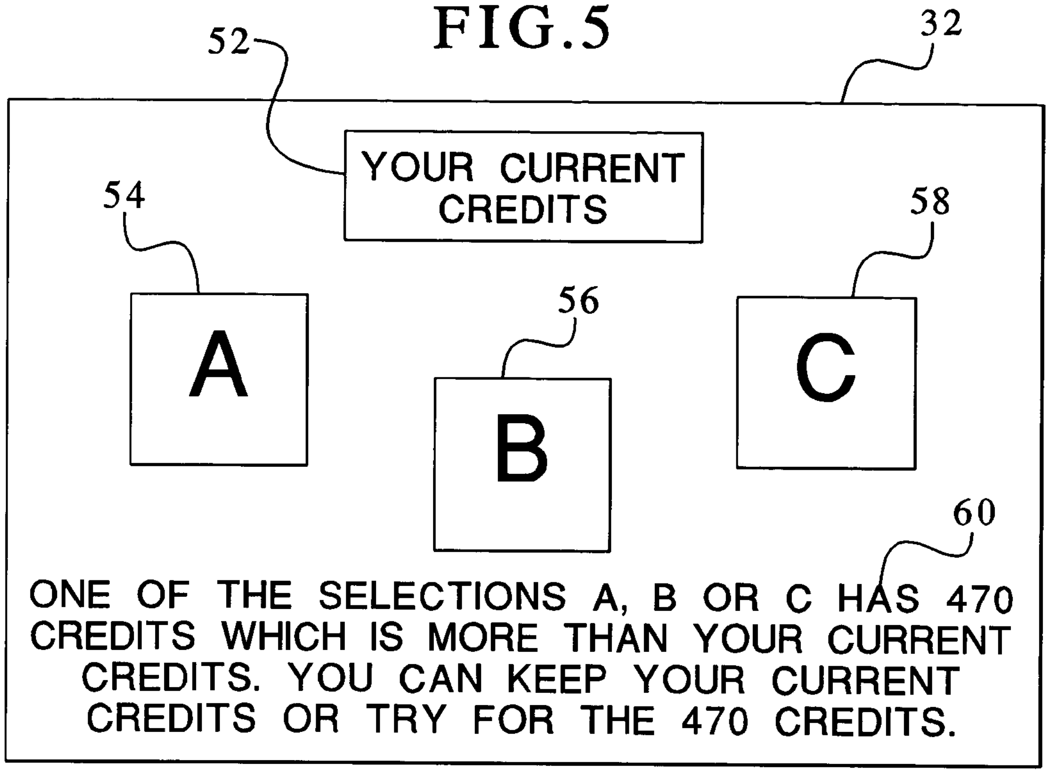
FIG. 5 is a front elevational view of the display device illustrating a further embodiment of the present invention, wherein the game discloses that an initial award exists and the value of the enticement award.

Referring now to FIG. 5, a further award selection embodiment is illustrated, wherein the game visually discloses more information than in the embodiment of FIG. 3. In this embodiment, the prompt 60 discloses the value of the enticement award, i.e., the phrase, "One of the selections A, B or C has 470 credits, which is more than your current credits." Neither the initial award selector 52 nor the prompt 60 disclose the value of the initial award. The player again has no idea how many more credits are obtainable, nor the relative values of the other two selectors. In this embodiment, the player does not know the value of the "safe" play, i.e., selecting the initial value selector 52.

In any of the embodiments illustrated herein, the game can provide any number of masking selectors, such as the selectors 54, 56 and 58. A predetermined number of masking selectors associate with enticement awards, i.e., awards having values greater than the initial award. The remainder of the selectors associate with consolation awards, i.e., awards having values less than the initial award. The present invention also contemplates a consolation award having an equal value to one or more initial awards. It should be appreciated that adding more initial awards and more masking selectors complicates the player's decision.

Figure 6:
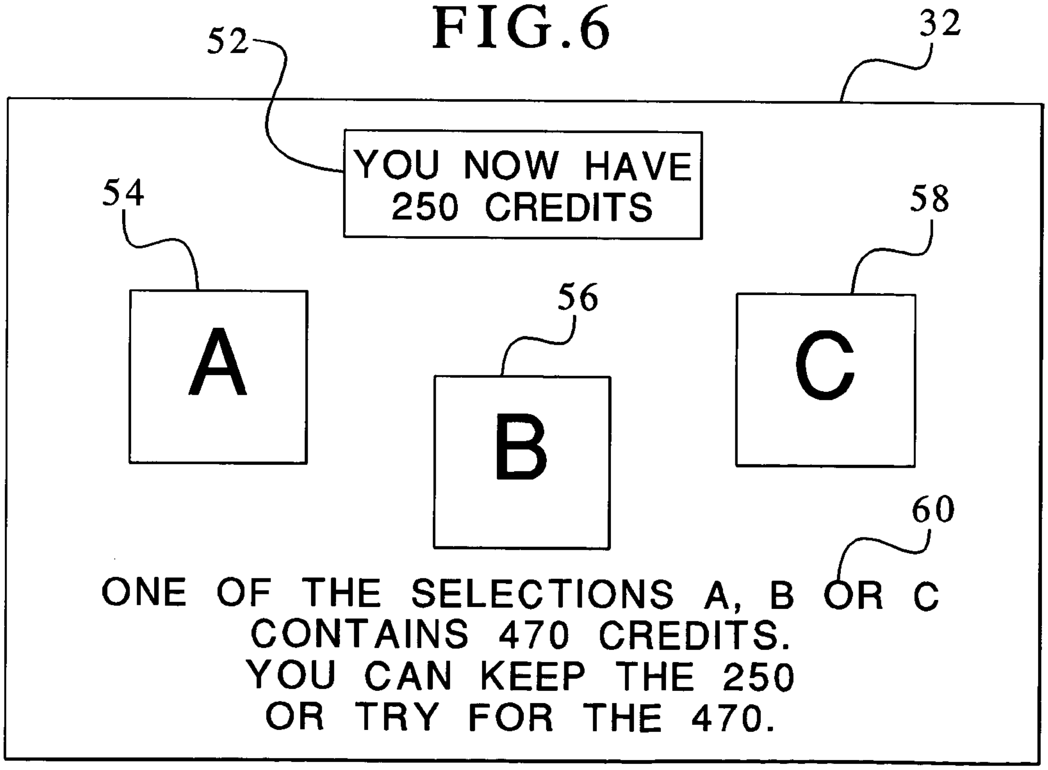
FIG. 6 is a front elevational view of the display device illustrating a preferred embodiment of the present invention, wherein the game discloses the value of an initial award and the value of the enticement award.

Referring now to FIG. 6, a preferred award selection embodiment is illustrated, wherein the game visually discloses more information than in the embodiments of FIGS. 3, 4 and 5. In this embodiment, the initial award selector 52 and the prompt 60 disclose the value of the initial award, e.g., the phrase, "You now have 250 credits." The prompt 60 also discloses the value of the enticement award, i.e., the phrase, "One of the selections A, B or C contains 470 credits. You can keep the 250 or try for the 470." The player here knows how many more credits are obtainable from one of the selectors but does not know the relative values of the other two selectors.

In this embodiment, the player knows the value of the "safe" play, i.e., selecting the initial value selector 52. The player can also gage the risk/reward ratio of selecting a masking selector. For instance, the player can assume that the two remaining masked awards have values below 250 and determine whether it is worth risking the 250 for a one in three chance at 470 credits. A player making such an assumption still wants to know how far the remaining masked awards are below 250.

It should be appreciated that a player, over time, can gain an idea of the relative values of masked awards. That is, after playing the bonus round of the present invention a plurality of times, the player can map the revealed awards (discussed below). Revealing the awards provides the persistent and astute player with an opportunity to record the enticement and consolation values. Each gaming device is driven by one more algorithms that take into account such things as the range of possible payouts from a bonus round. Assuming that a gaming device does not switch algorithms, the game consistently provides the same range of possible payouts. With an intuitive feel for the range of consolation awards, the experienced player can better gage the risk/reward ratio for selecting a masking selector.

The present invention contemplates randomly choosing the initial award, the enticement award and the consolation awards from separate databases (not shown), which is well known in the art of manufacturing gaming devices. The initial awards are therefore preferably randomly selected from a database (not illustrated) having a middle range of values. The enticement awards are preferably randomly selected from a database (not illustrated) having a higher range of values. The consolation awards are preferably randomly selected from a database (not shown) having a lower range of values. It should be appreciated that upon random selection, an initial award can be relatively desirable or undesirable and an enticement award can be relatively enticing or not enticing. If, as above, the initial award is 250 and the enticement award is 470 credits, the player may decide that 250 is enough. If the initial award is 90 and the enticement award is 405, the player may opt to play for a 315 credit increase (i.e., 405−90) even though the enticement award is lower than in the previous example (i.e., 405 v. 470).

Figure 7:
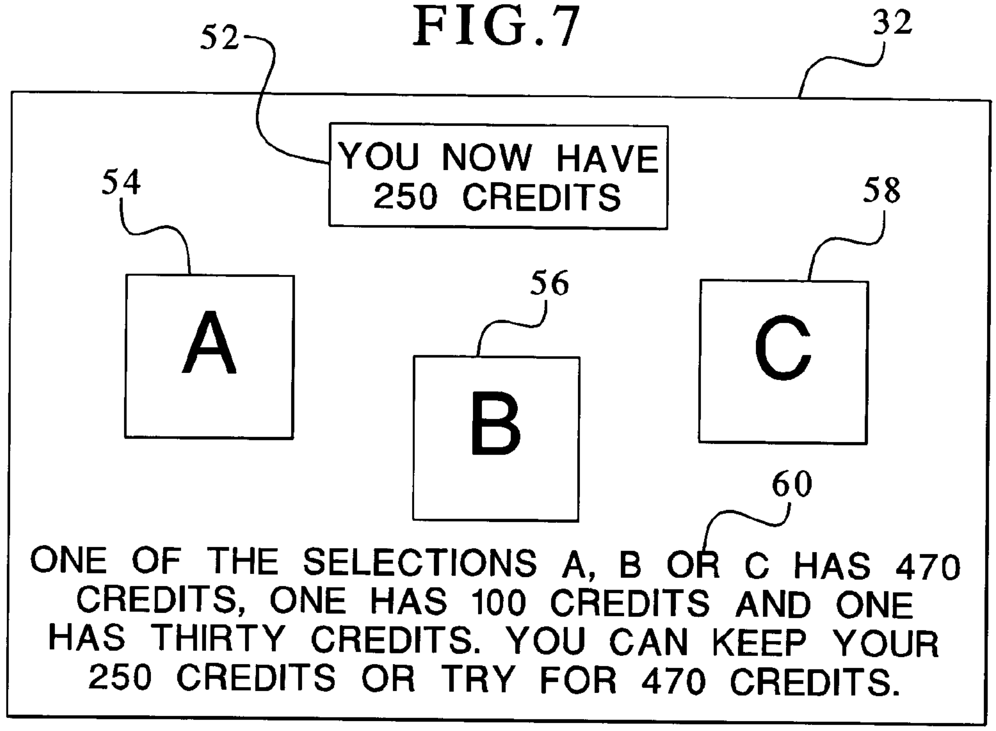
FIG. 7 is a front elevational view of the display device illustrating a yet another embodiment of the present invention, wherein the game discloses the value of an initial award, the value of the enticement award and the values of consolation awards.

Referring now to FIG. 7, one example of yet another award selection embodiment is illustrated, wherein the game visually discloses more information than in the preferred embodiment of FIG. 6. In this embodiment, the initial award selector 52 and the prompt 60 disclose the value of the initial award, e.g., the phrase, "You now have 250 credits." The prompt 60 also discloses the value of the enticement award, i.e., "One of the selections A, B or C has 470 credits . . . ". The prompt 60 further discloses the consolation award values, i.e., the phrase, "one (of A, B or C) has 100 credits and the other has thirty credits." As stated above, each consolation award is preferably greater than zero, however, in a stand alone game embodiment, one or more consolation awards can be zero. This embodiment also contemplates disclosing the values of less than all of the consolation awards.

The player here knows how many more credits are obtainable from one of the selectors and also knows the possible losses from the other two selectors. The player can determine that the average of the masked awards is 200 ((470+100+30)/3). The player can then optimally determine to keep the "safe" initial award and not risk choosing one of the masking selectors, since the initial award (250) is more than the average masked award (200).

Figure 8:
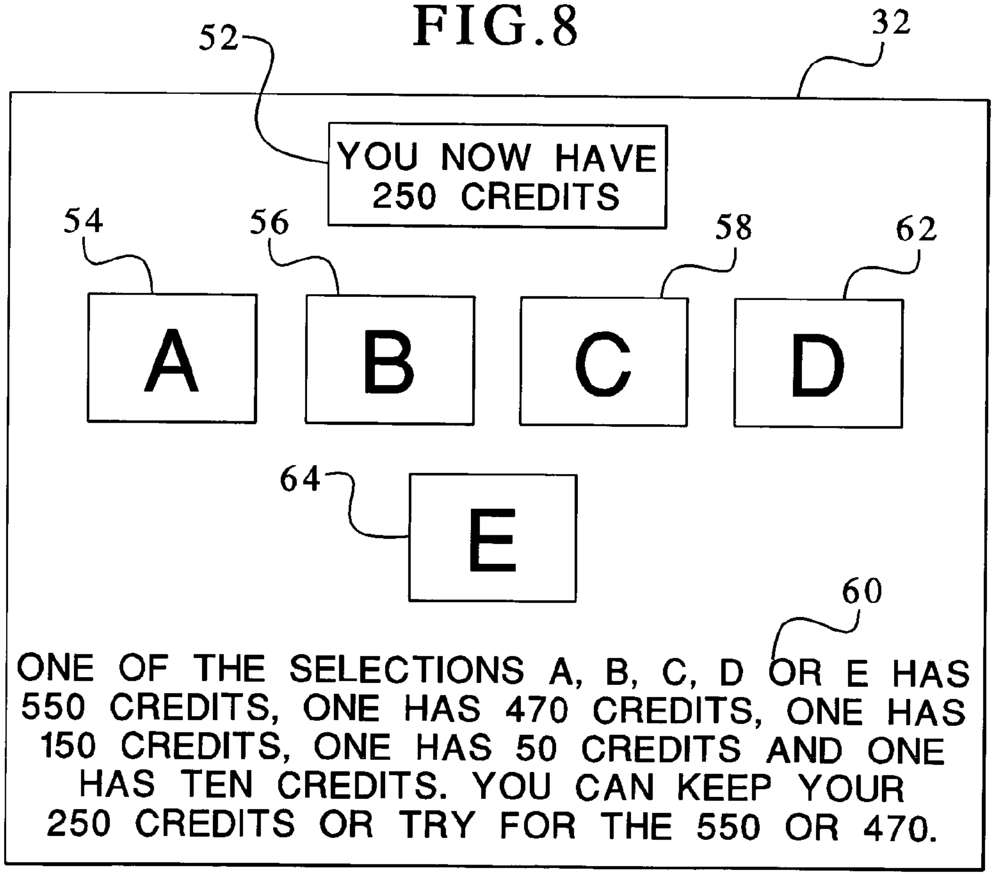
FIG. 8 is a front elevational view of the display device illustrating another example of the embodiment of FIG. 7, wherein the game contains and discloses the values of the initial award, multiple enticement awards and multiple consolation awards.

Referring now to FIG. 8, another example of the award selection embodiment of FIG. 7 is illustrated, wherein the game provides a plurality of enticement and consolation awards. In this example, the initial award selector 52 and the prompt 60 disclose the value of the initial award, e.g., the phrase, "You now have 250 credits." The prompt 60 also discloses the value of a plurality of enticement awards, i.e., the phrase, "One of the credit selections A, B, C, D or E has 550 credits, one has 470 credits . . . ". The prompt 60 further discloses the consolation award values associated with the masking selectors 54, 56, 58, 62 and 64, i.e., the phrase, "one (of A, B, C, D or E) has 150 credits, one has 50 credits and the other has ten credits." As stated above, each consolation award is preferably greater than zero, however, in a stand alone game embodiment, one or more consolation awards can be zero. This embodiment also contemplates disclosing the values of less than all of the enticement and consolation awards.

In this example, the player again knows how many more credits are obtainable from two of the selectors and also knows the possible losses from the other two selectors. The player can determine that the average award value is 262 ((550+470+230+50+10)/5). The player can then optimally determine not to keep the "safe" initial award and to risk choosing one of the masking selectors, since the initial award (250) is less than the average award (262).

Figure 9:
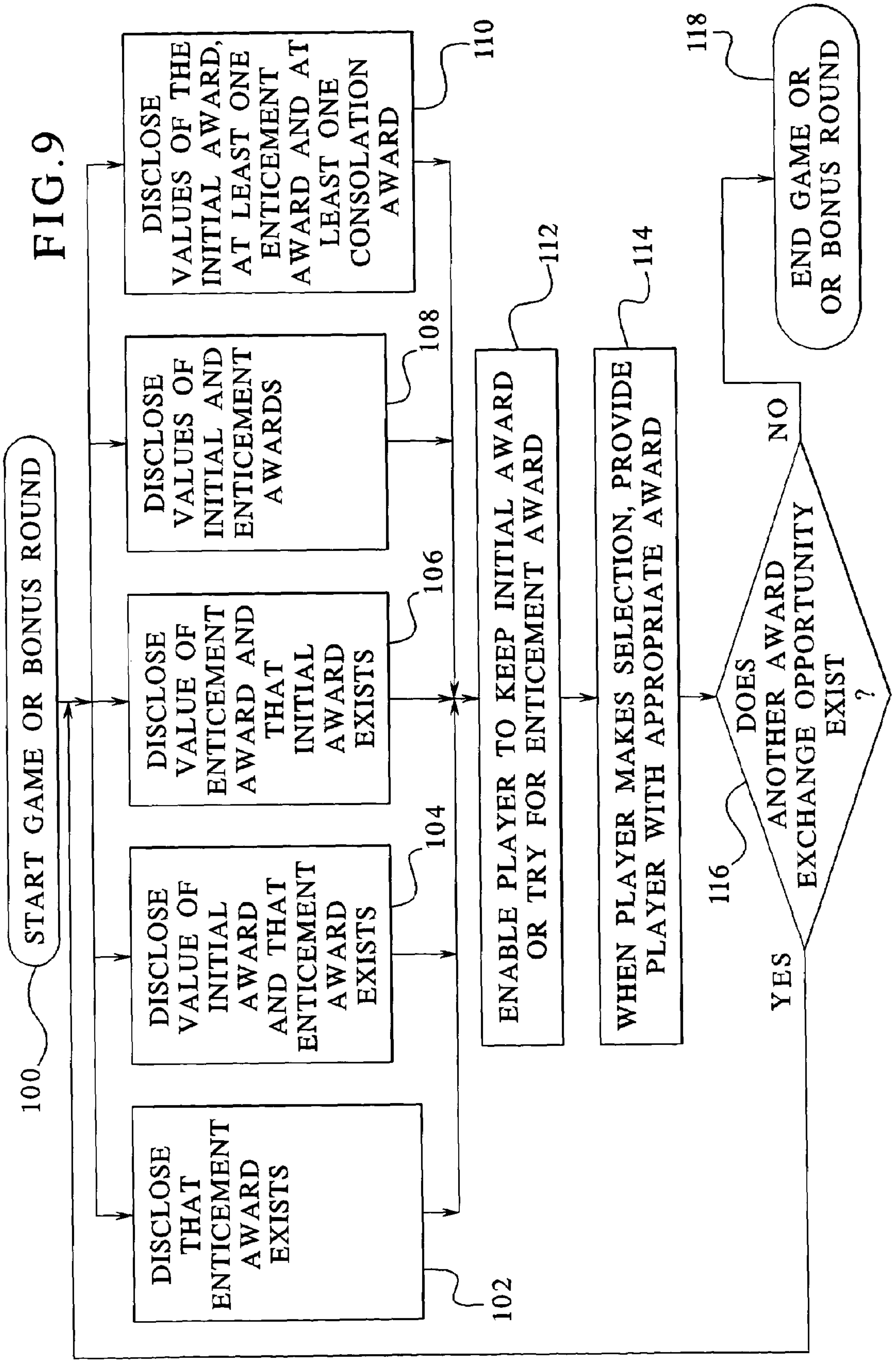
FIG. 9 is a process flow diagram illustrating the award exchange method of the present invention, wherein the game can include multiple award exchange opportunities and one or more value disclosures.

Referring now to FIG. 9, a process flow diagram summarizes the embodiments previously disclosed. After the game or bonus round begins, as indicated by the oval 100, the present invention provides one of the following disclosures: (i) a disclosure that an enticement award exists as indicated by the block 102; (ii) a disclosure of the initial award value and that an enticement award exists as indicated by the block 104; (iii) a disclosure of the enticement award value and that an initial award exists as indicated by the block 106; (iv) a disclosure of the initial and enticement award values as indicated by the block 108; and (v) a disclosure of the initial award, at least one enticement award and at least one consolation award as indicated by the block 110. The game enables the player to keep the initial award or try for an enticement award, as indicated by the block 112. After the player's selection, the game provides the appropriate award as indicated by block 114. Block 116 illustrates that the game contemplates providing the player with a plurality of award exchange opportunities, as indicated by the diamond 116. The present invention can employ different disclosures, i.e., one of the disclosures indicated by blocks 102, 104, 106, 108 and 110, in different award exchange opportunities. When the player exhausts all of such opportunities, the game or bonus round ends, as indicated by the oval 118.

Reveal Embodiments

Referring now to FIG. 10, a chart of the reveal sequence of the present invention is displayed illustrating each of the situations, wherein the player selects the initial award, the low valued masked award, an intermediate masked award, and the high valued masked award. The chart provides three masked awards as illustrated in FIG. 6. The method of revealing hereafter disclosed is illustrated with three masked awards. It should be appreciated, and it will be so illustrated, that the method of revealing includes any number of masked awards. The game preferably reveals or unmasks the awards after the player selects to keep the initial award or selects one of the masking selectors. The method of the present invention involves the award value order in which the present invention reveals the awards.

Row 68 of the chart of FIG. 10 contains chart headings. The chart heading 70 includes the player's selection. The chart heading 72 includes the award that the game first reveals based upon the chart heading entry. The chart heading 74 includes the award that the game secondly reveals based upon the chart heading entry. The chart heading 76 includes the award that the game thirdly reveals based upon the chart heading entry.

In a preferred touch screen embodiment, the revealed or unmasked awards preferably occupy the same area of the display device 32 (FIGS. 1, 3–8) as do their associated masking selectors (FIGS. 3–8). Alternatively, the game can reveal the award next to its associated masking selector. The game can further alternatively provide one area in which the game reveals all the awards and highlight the selector of the currently revealed award, thus designating the award's association. In any case, the present method determines in which order the awards are unmasked.

Referring to the row 78 of FIG. 10, the player elected to play it safe and keep the initial award, as can be seen under the heading 70. In this situation, the game only specifies that the high value or enticement award be revealed last. That is, the game randomly determines whether to reveal the low value or the intermediate consolation award first, as shown under the heading 72. The game then reveals the remaining consolation award second, as shown under the heading 74. The game can set a 50% chance of revealing either the low or intermediate consolation award first or maintain any percentage as desired by the implementor. Finally, the game reveals the high value enticement award, as shown under the heading 76.

Alternatively, when the player elects play it safe and keep the initial award, the game reveals each award simultaneously. It should be appreciated that once the player keeps the initial award, the player's fate is determined and the anticipation provided by the reveal sequence drops. Even so, revealing the awards after the player selects the initial award provides some measure of excitement, wherein the player thinks, e.g., "I was going to pick the masking selector that covered the enticement award. I'll get this game next time." For the sake of expeditious play, however, the implementor can decide to reveal all awards simultaneously.

Referring to the row 80 of FIG. 10, the player elected to forgo the initial award and try for the enticement award, as can be seen under the heading 70, and selected the low valued consolation award. In this situation, the game first reveals the intermediate consolation award, as shown under the heading 72. The game then reveals the player's selection of the low valued consolation award, as shown under the heading 74. Finally, the game reveals the high valued enticement award, as shown under the heading 76.

Referring to the row 82 of FIG. 10, the player elected to forgo the initial award and try for the enticement award, as can be seen under the heading 70, and selected the intermediate consolation award. In this situation, the game first reveals the low valued consolation award, as shown under the heading 72. The game then reveals the player's selection of the intermediate consolation award, as shown under the heading 74. Finally, the game reveals the high valued enticement award, as shown under the heading 76.

Referring to the row 84 of FIG. 10, the player elected to forgo the initial award and try for the enticement award, as can be seen under the heading 70, and successfully selected the enticement award. In this situation, the game only specifies that the high value or enticement award be revealed last. That is, the game randomly determines whether to reveal the low value or the intermediate consolation award first, as shown under the heading 72. The game then reveals the remaining consolation award second, as shown under the heading 74. The game can set a 50% chance of revealing either the low or intermediate consolation award first or maintain any percentage as desired by the implementor. Finally, the game reveals the high valued enticement award, as shown under the heading 76.

The present invention preferably employs two rules in determining the order in which to reveal awards: (1) the game preferably never reveals the player's selection first; and (2) the game preferably always reveals the highest valued enticement award last. These rules are based upon two assumptions. The first assumption is that as awards are revealed, anticipation builds up in the player, which increases excitement and enjoyment. Making the player wait to see the player's award promotes anticipation. The second assumption is that, if the player is shown and thus knows the value of the enticement award up front, when the game reveals the enticement award, the player will feel a let down. That is, the player is waiting to see where the game has hidden the enticement award. Once the game reveals the enticement award, the excitement level drops. Keeping the enticement award concealed maintains the excitement level and further promotes anticipation.

Referring now to FIG. 11, a chart of the reveal sequence of the present invention is illustrated, wherein the player can select from an initial award, a low valued masked award, a plurality of intermediate masked awards, and a plurality of high valued masked awards. The chart applies to the embodiment of FIG. 8, wherein the game provides two higher value enticement awards and three lower value consolation awards. Using the rules above, the game preferably reveals as many awards as possible before revealing the selected award. The game reveals the selected award, however, before revealing a final enticement award.

Row 86 of the chart of FIG. 11 contains chart headings. The chart heading 88 includes the player's selection. The chart heading 90 includes the award that the game first reveals based upon the chart heading entry. The chart heading 92 includes the award that the game secondly reveals based upon the chart heading entry. The chart heading 96 includes the award that the game thirdly reveals based upon the chart heading entry. The chart heading 98 includes the award that the game fourthly reveals based upon the chart heading entry. The chart heading 100 includes the award that the game fifthly reveals based upon the chart heading entry.

Referring to the row 102 of FIG. 11, the player elected to play it safe and keep the initial award, as can be seen under the heading 88. In this situation, the game only specifies that the high value or enticement awards be revealed last. That is, the game randomly determines whether to reveal the low value consolation award or either of the two intermediate consolation awards first, as shown under the heading 90. The game then applies the same random determination for the second revealing upon the two remaining consolation awards, as shown under the heading 92. The game then thirdly reveals the remaining consolation award, as shown under the heading 96. The game can maintain any random determination percentage for the consolation awards desired by the implementor. Finally, the game randomly and fourthly reveals one of the high value enticement awards and fifthly reveals the remaining enticement award, as indicated under the headings 98 and 100.

As stated above, for the sake of expeditious play, the implementor can alternatively not employ the reveal sequence when the player keeps the initial award; but rather, reveal each of the awards simultaneously. Noting the two rules and assumptions described above, after a player keeps the initial award: (i) the anticipation and excitement in learning of the player's award is gone; and (ii) the anticipation and excitement in learning of the enticement award location is lessened since the award is no longer obtainable.

Referring to the row 104 of FIG. 11, the player elected to forgo the initial award and try for the enticement award, as can be seen under the heading 88, and selected the low valued consolation award. In this situation, the game randomly reveals the first and second intermediate consolation awards as described above, and as shown under the headings 90 and 92, respectively. The game then randomly selects and reveals one of the enticement awards third, as shown under the heading 96. The game fourthly reveals the player's selection of the low valued consolation award, as illustrated under the heading 98. The game fifthly and finally reveals the remaining enticement award, as indicated under the heading 100.

Referring to the row 106 of FIG. 11, the player elected to forgo the initial award and try for the enticement award, as can be seen under the heading 88, and selected one of the intermediate consolation awards. In this situation, the game first reveals either the low valued consolation award or the non-selected intermediate value consolation award, as shown under the heading 90. The game then randomly reveals the remaining low valued consolation award or the non-selected intermediate consolation award as described above, and as shown under the heading 92. Thirdly, the game randomly selects and reveals an enticement award, as illustrated under heading 96. The game then reveals the player's selection of the intermediate valued consolation award, as shown under the heading 98. Finally, the game fifthly reveals the remaining high value enticement award, as indicated under the heading 100.

Referring to the row 108 of FIG. 11, the player elected to forgo the initial award and try for the enticement award, as can be seen under the heading 88, and successfully selected one of the high valued enticement awards. In this situation, the game specifies that selected enticement award be revealed last and the unselected high value enticement award third to last. That is, the game randomly determines whether to reveal the low value or the intermediate consolation awards first and second, as shown under the headings 90 and 92, respectively, and as disclosed in connection with row 102. The game thirdly reveals the unselected high value enticement award and fourthly reveals the remaining low or intermediate consolation award to build suspense in the final two picks. Finally, the game reveals the selected high value enticement award, as indicated under the heading 100.

MECHANICAL DISPLAY

Figure 12:
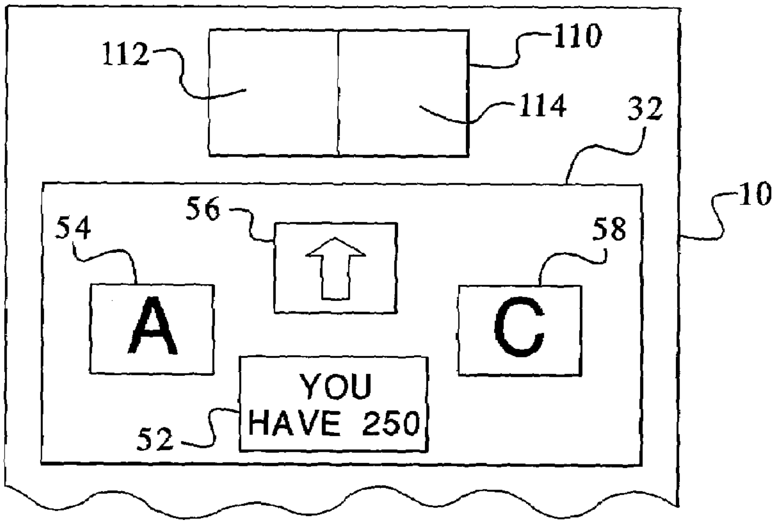
FIG. 12 is a front elevational view illustrating an example of a separate electro-mechanical display mechanism in a masking position, said display mechanism operating in conjunction with the display device to reveal an award of the present invention.

Referring now to FIG. 12, a front elevational view of an example of a separate electromechanical display mechanism 110 is illustrated, which operates in conjunction with a secondary display device (not shown) and the display device 32 to reveal one or a plurality of selected awards. FIG. 12 illustrates gaming device 10 having an area above the display device 32, on the front side of the gaming device 10, on which to position the display mechanism 110. Display mechanism 110 is preferably juxtaposed next to the display device 32, as shown, such that a directional indicator, such as the arrow displayed as the indicia of selector 56 can readily direct the player to the display mechanism. That said, the present invention contemplates positioning the display mechanism 110 to the left of, to the right of and underneath as well as above the display device 32.

The display mechanism 110 includes a slideable left door 112, which slides open to the left, and a slideable right door 114, which slides open to the right. Both doors 112 and 114 are preferably slideably affixed to the front of gaming device 10, such that they are restrained from moving outward from the gaming device, into the gaming device, are restrained from moving too far to the left or right, respectively, e.g., 2 to 3 inches (5.0 to 7.5 cm) to the left or right, respectively, and preferably meet each other when in a closed position and are thus restrained from moving too far to the right or left, respectively.

A first motor (not shown) preferably mounts to the gaming device 10, and has suitable linkages (not shown), which ultimately mount to the left door (not shown), such that when said first motor rotates in one direction, the left door 112 opens or moves to the left and when said motor rotates in an opposite direction, the left door 112 closes or moves to the right. A second motor (not shown) preferably mounts to the gaming device 10, and has suitable linkages (not shown), which ultimately mount to the right door (not shown), such that when said second motor rotates in one direction, the right door 114 opens or moves to the right and when said motor rotates in an opposite direction, the right door 114 closes or moves to the left.

A first pair of suitable switches, such as optical switches (not shown) are mounted to the gaming device 10 on preferably both sides of the interface between both doors of the display mechanism 110. The first pair of switches detect when the door is open and send a signal to the controller to stop the motors from further opening the doors 112 and 114. A second pair of suitable switches, such as mechanical switches (not shown) are mounted to the gaming device 10 preferably above or below the display mechanism 110. The second pair of switches detect when the door is closed and send a signal to the controller to stop the motors from further closing the doors 112 and 114. The controller of the present invention determines when the doors open and close and commands the first and second motors, accordingly, as described below.

The doors 112 and 114 are preferably constructed of an opaque or non-transparent material such as aluminum, steel, stainless steel, opaque plastic or opaque fiberglass. The doors thus hide any indicia displayed by the gaming device on a secondary display behind said doors when said doors are closed. The present invention contemplates using said doors as a separate masking device. The doors are preferably not selectable, as the masking selectors 54 and 58 preferably are. The gaming device therefore preferably includes a touch screen selector 56 for selecting an award associated with the display mechanism 110. The selector for the display mechanism 110 can alternatively be a separate electromechanical front panel mountable input device 33.

Figure 13:
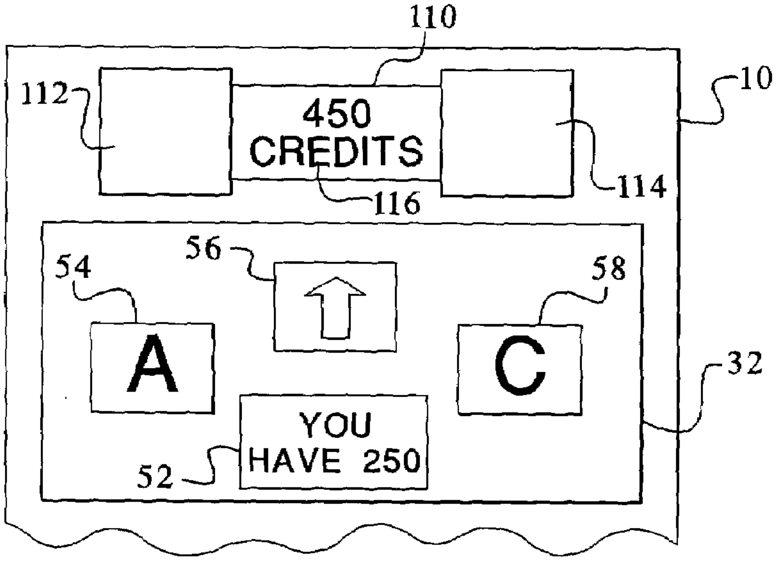
FIG. 13 is a front elevational view illustrating an example of a separate electromechanical display mechanism in an open position, revealing a secondary display operating in conjunction with the display device to reveal selected awards of the present invention.

Referring now to FIG. 13, the display mechanism 110 is illustrated with the mechanical doors open. When the controller reveals the award associated with the selector 56 and the display mechanism 110, the game opens doors 112 and 114 in the manner described above. A secondary display device 116 is preferably mounted to the gaming device 10 behind the display mechanism 110. In one embodiment, the secondary display device 116 can be any known video monitor, television screen, dot matrix display, CRT, LED, LCD or electro-luminescent display. This simulated secondary display device 116 can be color or monochrome although, preferably, the display is color. The simulated secondary display device is connected to the controller of gaming device 10 in the same manner as display device 32, illustrated in FIG. 2. The simulated secondary display device can also contain a touch screen 46 and associated touch screen controller 48.

Figure 14:
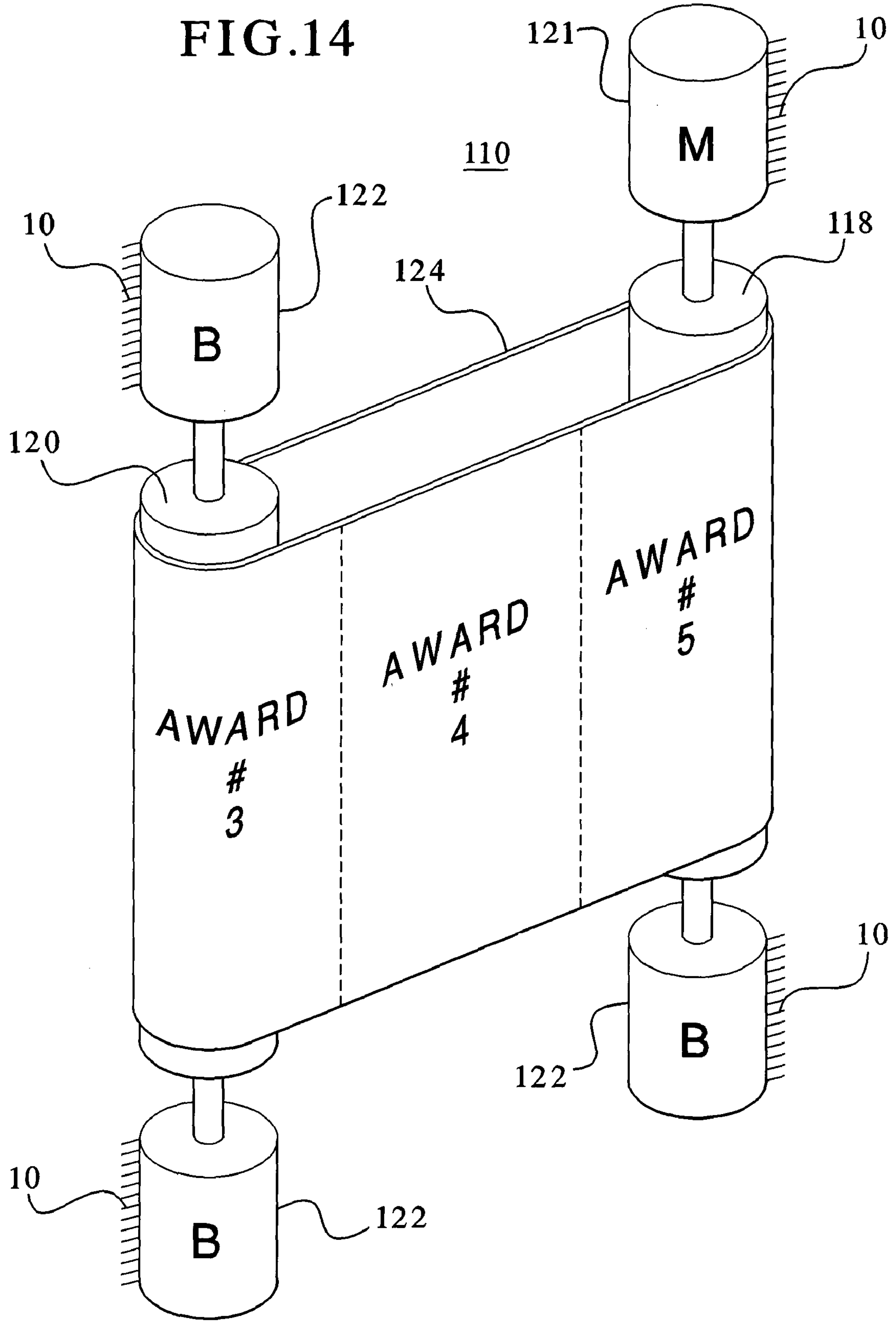
FIG. 14 is a top-front perspective view of a preferred secondary display device embodiment of the present invention employing two rollers and an award displaying belt in tension with such rollers.

Referring now to FIG. 14, a preferred secondary display device embodiment 116 is illustrated, wherein the secondary display 116 includes two rollers 118 and 120. One roller 118 is a drive roller and is suitably attached to a motor 121 and a bearing 122, which are fixed to the gaming device 10. The motor 121 can thus rotate the roller 118 clockwise or counterclockwise as determined by the controller of gaming device 10. The motor 121 can be a stepper motor having a drive (not shown) and programmable indexer (not shown), which are well known in the art and enable the motor to precisely turn roller 118 and position a belt 124. The second roller 120 is a follower roller and is suitably attached to two bearings 122, which are fixed to gaming device 10. The follower roller 120 is driven by the belt 124, which is in tension with the rollers 118 and 120, such that the belt 124 does not slip along the rollers 118 and 120 due to gravity or due to the rotation of the rollers. When the motor 121 drives roller 118, belt 124 moves and in turn rotates the follower roller 120.

The belt 124 preferably displays a plurality of awards, such as the award #3, award #4 and award #5 illustrated by FIG. 14. The belt 124 can display any award indicia designed by the implementor including numerical award values, an image in conjunction with a value and a character in conjunction with a value. In certain embodiments, the display can include one or more images and/or characters. The motor 121, preferably a stepper motor as described above, is programmable and can rotate the belt in two directions, using variable velocities and accelerations and stop the bet at any time to display any award desired by the implementor.

In another embodiment (not illustrated), the secondary display device 116 is a separate paystop display containing one or more mechanical reels, wherein each reel includes a plurality of award values. It should be appreciated that the implementor can create other different mechanical award generating mechanisms, such as a spinning wheel, and the present invention is not limited to the embodiments herein disclosed.

In any secondary display embodiment, the secondary display 116 is capable of displaying a randomly generated value such as the 450 credits shown on the secondary display 116 of FIG. 13. The game can generate the value before opening the doors 112 and 114 or after, as desired by the implementor. The game preferably associates the display mechanism 110, as illustrated, with one selector 56 and accordingly with the award associated with selector 56.

Figure 15:
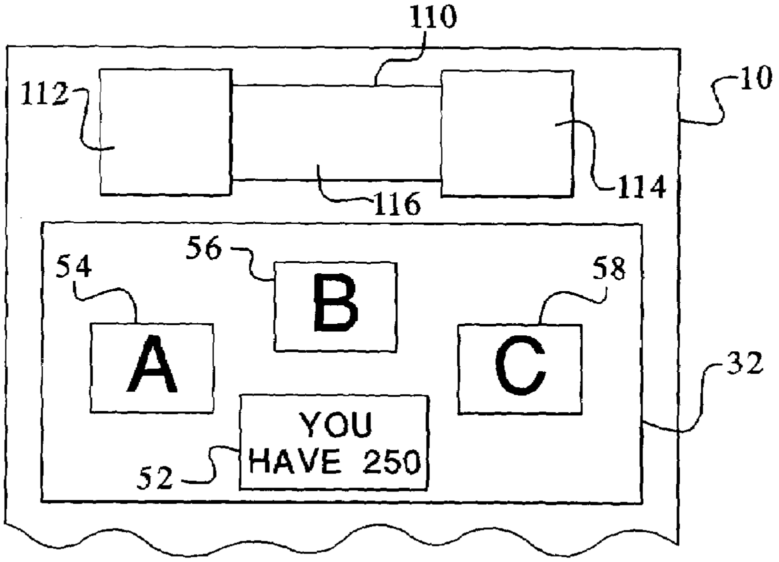
FIG. 15 is a front elevational view illustrating an alternative embodiment, wherein the separate display mechanism reveals all of the awards of the present invention.

Referring now to FIG. 15, the present invention contemplates an alternative embodiment, wherein the display mechanism 110 reveals the awards for a plurality of or for all three selectors 54, 56 and 58. In this embodiment, a plurality and preferably all of the selectors, merely enable the player to input a selection but do not otherwise reveal or unmask an award. When a player picks one of the selectors, the game preferably carries out the appropriate reveal sequence, described above, upon the secondary display 116 of the display mechanism 110.

For example, referring to the reveal sequence illustrated with the row 80 of FIG. 10, if the player elects to forgo the initial award, tries for the enticement award and selects the low valued consolation award: (i) the doors 112 and 114 open, the game first reveals the intermediate consolation award and the doors close; (ii) the doors 112 and 114 open, the game secondly reveals the player's selection of the low valued consolation award and the doors close; and (iii) the doors 112 and 114 open, the game reveals the high valued enticement award and the doors close. In another example, the doors 112 and 114 open once, the game displays the entire reveal sequence and the doors close. The present invention contemplates any combination of these two examples revealing any reveal sequence designed by the implementor. If the player elects to play it safe and select the initial award, the game can: (i) reveal all values with the doors opening and closing one time; (ii) reveal individual values with the doors opening and closing a plurality of times; or (iii) provide any suitable reveal means on the display device 32 such as enabling selectors 54, 56 and 58 to once again reveal or unmask the awards.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor and in communication with a remote server through a data network, said gaming device comprising:

a cabinet;

a primary game controlled by the processor and operable upon a wager by a player;

a secondary game controlled by the processor and associated with the primary game; said secondary game including a plurality of symbols a primary display supported by the cabinet, said primary display adapted to display the primary game;

a secondary display supported by the cabinet, said secondary display adapted to display the secondary game;

at least one movable member which selectively masks said secondary display; and at least one actuator operable to move the movable member to reveal the secondary display after a designated instruction to reveal the secondary display is sent from the server to the processor, said processor programmed to randomly determine said symbols displayed by the secondary display, wherein said designated instruction sent from the server to the processor is independent of any symbols displayed by the secondary display.

2. The gaming device of claim 1, which includes a triggering event, wherein said processor is programmed to cause the actuator to move said movable member to reveal said secondary display upon the occurrence of said triggering event and after the designated instruction is sent from the server to the processor.

3. The gaming device of claim 1, which includes a plurality of movable members which mask the secondary display, wherein said actuator is operable to cause said movable members to move to reveal the secondary display after the designated instruction is sent from the server to the processor.

4. The gaming device of claim 1, which includes a plurality of movable members which mask the secondary display and a plurality of actuators, wherein each actuator is operable to cause one of the movable members to move to reveal the secondary display after the designated instruction is sent from the server to the processor.

5. The gaming device of claim 1, which includes a plurality of symbols adapted to be displayed by said secondary display, wherein at least one of said symbols is revealed when said moveable member is moved to reveal said secondary display.

6. The gaming device of claim 5, wherein said plurality of symbols includes a plurality of award indicia.

7. The gaming device of claim 1, which includes at least one speaker operable to generate a sound effect when the movable member reveals said secondary display.

8. The gaming device of claim 1, which includes a player activated device, wherein the actuator causes said movable member to reveal said secondary display after a player activated device is activated and after the designated instruction is sent from the server to the processor.

9. The gaming device of claim 1, wherein said secondary display is selected from the group consisting of: a video monitor, a television screen, a dot matrix display, a cathode ray tube, a light emitting diode, a liquid crystal display, and a electro-luminescent display.

10. The gaming device of claim 1, wherein said secondary display includes at least one mechanical reel.

11. The gaming device of claim 10, wherein said mechanical reel displays at least one award indicia.

12. The gaming device of claim 1, wherein said secondary display includes at least one movable roller.

13. The gaming device of claim 12, wherein said movable roller displays at least one award indicia.

14. The gaming device of claim 1, wherein said secondary display includes at least one movable wheel.

15. The gaming device of claim 14, wherein said movable wheel displays at least one award indicia.

16. The gaming device of claim 1, which includes a directional indicator displable by said primary display to direct a player to said secondary display.

17. A gaming device operable under control of a processor and in communication with a remote server through a data network, said gaming device comprising:

- a housing;
- a primary game controlled by the processor and operable upon a wager by a player;
- a secondary game controlled by the processor and associated with the primary game; said secondary game including a plurality of symbols
- a primary display mounted in said housing, the primary display adapted to display the primary game;
- a secondary display mounted in said housing, the secondary display adapted to display the secondary game;
- a directional indicator adapted to be displayed by said primary display, said directional indicator adapted to direct the player to said secondary display;
- at least one movable member connected to the housing which is operable to selectively mask said secondary display;
- at least one actuator operable to cause said movable member to reveal the secondary display; and
- said processor operable to cause said directional indicator to direct the player to said secondary display, and cause the actuator to cause the movable member to reveal said secondary display after a designated instruction to reveal the secondary display is sent from the server to the processor, wherein said processor is programmed to randomly determine said symbols displayed by the secondary display, and said designated instruction sent from the server to the processor is independent of any symbols displayed by the secondary display.

18. The gaming device of claim 17, which includes a plurality of symbols, wherein said processor is operable to cause said secondary display to display said determined symbol after said directional indicator directs the player to said secondary display.

19. The gaming device of claim 18, wherein said plurality of symbols include award indicia.

20. The gaming device of claim 17, wherein said movable member is formed from a non-transparent material.

21. The gaming device of claim 17, which includes a triggering event, wherein said processor is operable to cause the actuator to cause the movable member to reveal said secondary display upon the occurrence of said triggering event and after the designated instruction is sent from the server to the processor.

22. The gaming device of claim 17, which includes a player activated device, wherein the actuator causes said movable member to reveal said secondary display after the player activated device is activated and after the designated instruction is sent from the server to the processor.

23. The gaming device of claim 17, which includes at least one speaker which said processor causes to generate a sound effect when the movable member reveals said secondary display.

24. The gaming device of claim 17, wherein said secondary display is selected from the group consisting of: a video monitor, a television screen, a dot matrix display, a cathode ray tube, a light emitting diode, a liquid crystal display, and a electro-luminescent display.

25. The gaming device of claim 17, wherein said secondary display includes at least one mechanical reel.

26. The gaming device of claim 25, wherein said mechanical reel displays at least one award indicia.

27. The gaming device of claim 17, wherein said secondary display includes at least one movable roller.

28. The gaming device of claim 27, wherein said movable roller displays at least one award indicia.

29. The gaming device of claim 17, wherein said secondary display includes at least one movable wheel.

30. The gaming device of claim 29, wherein said movable wheel displays at least one award indicia.

31. A gaming device operable under control of a processor and in communication with a remote server through a data network, said gaming device comprising:

- a primary game controlled by the processor and operable upon a wager;
- a secondary game controlled by the processor and associated with the primary game;
- a primary display device including a first display, said primary display device adapted to display the primary game;
- a secondary display device including a second display, said secondary display device adapted to display the secondary game;
- a movable first member masking a first portion of the second display;
- a movable second member masking a second portion of the second display;
- at least one actuator operable to cause said first and second members to selectively reveal said masked portions of said second display;
- a plurality of symbols; and
- said processor operable to randomly select one of said plurality of symbols, cause said secondary display device to display said selected symbol, and cause the actuator to move said first member and said second member to reveal said second display after a designated instruction to reveal the second display is sent from the server to the processor, wherein said designated instruction sent from the server to the processor is independent of any symbols displayed by the secondary display device.

32. The gaming device of claim 31, wherein said first member and second member are formed of a non-transparent material.

33. The gaming device of claim 31, which includes a triggering event, wherein said processor is operable to cause the actuator to move said first member and second member to reveal said second display upon the occurrence of said triggering event and after the designated instruction is sent from the server to the processor.

34. The gaming device of claim 31, which includes a player activated device, wherein the actuator causes said first member and said second member to reveal said second display after the player activated device is activated and after the designated instruction is sent from the server to the processor.

35. The gaming device of claim 31, wherein said second display is selected from the group consisting of: a video monitor, a television screen, a dot matrix display, a cathode ray tube, a light emitting diode, a liquid crystal display, and a electro-luminescent display.

36. The gaming device of claim 31, wherein said second display includes at least one mechanical reel.

37. The gaming device of claim 36, wherein said mechanical reel displays at least one award indicia.

38. The gaming device of claim 31, wherein said second display includes at least one movable roller.

39. The gaming device of claim 38, wherein said movable roller displays at least one symbol which is an award indicia.

40. The gaming device of claim 31, wherein said second display includes at least one movable wheel.

41. The gaming device of claim 40, wherein said movable wheel displays at least one symbol which is an award indicia.

42. The gaming device of claim 31, which includes at least one speaker which said processor is operable to cause to generate a sound effect when said first member and said second member reveal said second display.

43. A gaming device operable under control of a processor and in communication with a remote server through a data network, said gaming device comprising:

a primary game controlled by the processor and operable upon a wager;

a secondary game controlled by the processor and associated with said primary game; said secondary game including a plurality of symbols a first display adapted to display the primary game;

a second display juxtaposed next to said first display, said second display adapted to display the secondary game;

a directional indicator adapted to be displayed by said first display and to direct a player to said second display;

a slideable first member which masks a first portion of the second display;

a slideable second member which masks a second portion of the second display;

a first motor connected to said first member;

a second motor connected to said second member; and said processor operable to cause said directional indicator to direct the player to said second display, and to cause the first motor and second motor to respectively slide said first member and said second member to reveal said masked first and second portions of the second display after a designated instruction to reveal the second display is sent from the server to the processor;

said processor programmed to randomly determine said symbols displayed by the second display, wherein said designated instruction sent from the server to the processor is independent of any symbols displayed by the second display.

44. The gaming device of claim 43, which includes a plurality of symbols from which said processor is operable to select one of said symbols and cause said symbol to be displayed by second display after said directional indicator directs the player to said second display and after the designated instruction is sent from the server to the processor.

45. The gaming device of claim 44, wherein said plurality of symbols include award indicia.

46. The gaming device of claim 43, which includes a first sensing device and a second sensing device, wherein the first sensing device is operable to send a signal to the processor to cause said processor to stop the first motor from sliding the first member, and the second sensing device is operable to send a signal to the processor to causes said processor to stop the second motor from sliding the second member.

47. The gaming device of claim 46, wherein said first sensing device and second sensing device include a pair of optical switches which are positioned to detect when said second display is revealed.

48. The gaming device of claim 43, wherein said first member and second member are formed of a non-transparent material.

49. The gaming device of claim 43, which includes a triggering event, wherein said processor is operable to cause the first and second motor to respectively slide said first member and said second member to reveal said second display upon the occurrence of said triggering event and after the designated instruction is sent from the server to the processor.

50. The gaming device of claim 43, which includes a player activated device connected to the processor, wherein said processor is operable to cause the first motor and second motor to respectively slide said first member and said second member to reveal said second display when the player activated device is activated and after the designated instruction is sent from the server to the processor.

51. The gaming device of claim 43, wherein the second display includes a medium exhibiting a plurality of symbols which is coupled between a drive roller connected to said processor and a follower roller so that one of the symbols is shown in said second display, wherein said processor is operable to cause the drive roller to move said medium so that a symbol on said medium selected by said processor is displayed by said second display.

52. The gaming device of claim 51, wherein said plurality of symbols include award indicia.

53. The gaming device of claim 43, which includes at least one speaker which said processor is operable to cause to generate a sound effect when the said first member and said second member reveal said second display.

54. The gaming device of claim 43, wherein the second display includes a paystop display which includes at least one mechanical reel which exhibits a plurality of symbols and at least one of said symbols is displayed by said second display.

55. The gaming device of claim 43, wherein the second display includes a spinning wheel which exhibits a plurality of symbols and at least one of said symbols is displayed by said second display.

56. A gaming device operable under control of a processor and in communication with a remote server through a data network, said gaming device comprising:

a cabinet;

a primary game controlled by the processor and operable upon a wager;

a secondary game controlled by the processor and associated with the primary game; said secondary game including a plurality of symbols a primary display supported by the cabinet, the primary display adapted to display the primary game;

a secondary display supported by the cabinet, the secondary display adapted to display the secondary game;

at least one movable member having a closed position at which said movable member masks the secondary display and an open position at which said movable member reveals the secondary display;

means for moving said movable member between the closed position and the open position after a designated instruction to reveal the secondary display is sent from the server to the processor;

wherein said processor is programmed to randomly determine said symbols displayed by the secondary display, and said designated instruction sent from the server to the processor is independent of any symbols displayed by the secondary display.

57. A method for operating a gaming device operable under control of a processor and in communication with a remote server through a data network, said gaming device having a primary game controlled by the processor and operable upon a wager, a secondary game controlled by the processor and associated with said primary game, a primary display adapted to display the primary game and a secondary display adapted to display the secondary game, said method comprising:

(a) receiving a designated instruction to reveal the secondary display sent from the server to the processor;

(b) causing the processor to randomly determine at least one symbol to display on the secondary display;

(c) unmasking the secondary display with at least one moveable member; and (d) displaying said symbol on the secondary display, wherein said designated instruction sent from the server to the processor is independent of any symbols displayed on the secondary display.

58. The method of claim 57, wherein said plurality of symbols includes award indicia.

59. The method of claim 57, which includes generating a sound effect during revealing said symbol displayed on the secondary display.

60. The method of claim 57, which includes displaying an indication for directing a player to the secondary display.

61. The method of claim 57, wherein said secondary display includes at least one mechanical reel displaying at least one of said symbols.

62. The gaming device of claim 57, wherein said secondary display includes at least one movable roller displaying at least one of said symbols.

63. The gaming device of claim 57, wherein said secondary display includes at least one movable wheel displaying at least one of said symbols.

64. A method for operating a gaming device operable under control of a processor and in communication with a remote server through a data network, said gaming device having a primary game controlled by the processor and operable upon a wager and a secondary game controlled by the processor and associated with said primary game, said method comprising:

(a) receiving a designated instruction to reveal a secondary display sent from the server to the processor;

(b) unmasking said secondary display with at least one slideable member to display a secondary display juxtaposed adjacent to a primary display, wherein the primary display is adapted to display the primary game and the secondary display is adapted to display the secondary game;

(c) causing the processor to randomly select a symbol from a plurality of symbols; and (d) displaying said symbol on said secondary display, wherein said designated instruction sent from the server to the processor is independent of the symbol displayed on the secondary display.

65. The method of claim 64, wherein said plurality of symbols includes award indicia.

66. The method of claim 64, which includes generating a sound effect during revealing said symbol displayed on the secondary display.

67. The method of claim 64, wherein said secondary display includes at least one mechanical reel displaying at least one of said symbols.

68. The method of claim 64, wherein said secondary display includes at least one movable reel displaying at least one of said symbols.

69. The method of claim 64, wherein said secondary display includes at least one movable roller displaying at least one of said symbols.

70. The method of claim 64, wherein said secondary display includes at least one movable wheel displaying at least one of said symbols.

71. A gaming device operable under control of a processor and in communication with a remote server through a data network, said gaming device comprising:

a cabinet;

a primary game controlled by the processor and operable upon a wager;

a primary wagering game display supported by the cabinet and operable to display said primary wagering game;

a secondary game controlled by the processor and operable after a triggering event in said primary wagering game;

a secondary game display supported by the cabinet and operable to display at least part of the secondary game;

an award adapted to be provided to the player, said award obtainable in the secondary game and displayable by the secondary game display, wherein said processor is programmed to randomly determine said award displayed by the secondary display;

a first movable member which selectively masks a portion of said secondary game display; and a first actuator operable to move the first movable member to unmask the secondary game display after a designated instruction to reveal the secondary display is sent from the server to the processor, wherein said designated instruction sent from the server to the processor is independent of the award displayed by the secondary display.

72. The gaming device of claim 71, which includes a second movable member which selectively masks a portion of the secondary display, and a second actuator operable to move the second movable member to unmask the secondary game display after the designated instruction is sent from the server to the processor.

73. The gaming device of claim 72, wherein the award is a higher value enticement award which is selectable by the player.

* * * * *